United States Patent [19]
Meister

[11] 3,716,985
[45] Feb. 20, 1973

[54] LINE TIGHTENING LEVER

[76] Inventor: Clarence P. Meister, 42024 Stanberry Avenue, Sterling Heights, Mich. 48078

[22] Filed: Dec. 13, 1971

[21] Appl. No.: 207,242

[52] U.S. Cl..............................24/68 F, 135/15 CF
[51] Int. Cl.........................A44b 21/00, A45f 1/18
[58] Field of Search........135/15 CF, 15 PE; 24/68 F, 24/68 E, 68 CD, 68 SB, 68 R, 71.3

[56] References Cited

UNITED STATES PATENTS

| | | | |
|---|---|---|---|
| 400,606 | 4/1889 | Scott | 24/71.3 |
| 1,792,468 | 2/1931 | Sheckels et al. | 24/71.3 |
| 2,090,005 | 8/1937 | Kendzy | 24/71.3 |
| 3,199,520 | 8/1965 | Cawood | 135/15 PE |

Primary Examiner—Donald A. Griffin
Attorney—William T. Sevald

[57] ABSTRACT

A line tightening lever having a pivotal or hook end constituting the fulcrum point, a line attaching eye constituting the weight point, and a power bar arm extending from the eye at a relatively large angle relative to an axis extending between the hook end and the eye so that when the lever is swung by moving the arm angularly past the axis, the hook end pivots and the eye moves sidewise off the axis and endwise toward the plane of the hook extending the line under added tension to tighten it. A second arm extension handle on the first arm beyond the engaging means provides the user with added mechanical advantage to swing the lever. The arm has engaging means for abutting the line in the tightened position to prevent reverse swing of the lever thereby maintaining the increased tension on the line. Upon the lever being released, the engaging means forces a turn in the line thereby shortening the extension of the line to add to the tension exerted.

2 Claims, 4 Drawing Figures

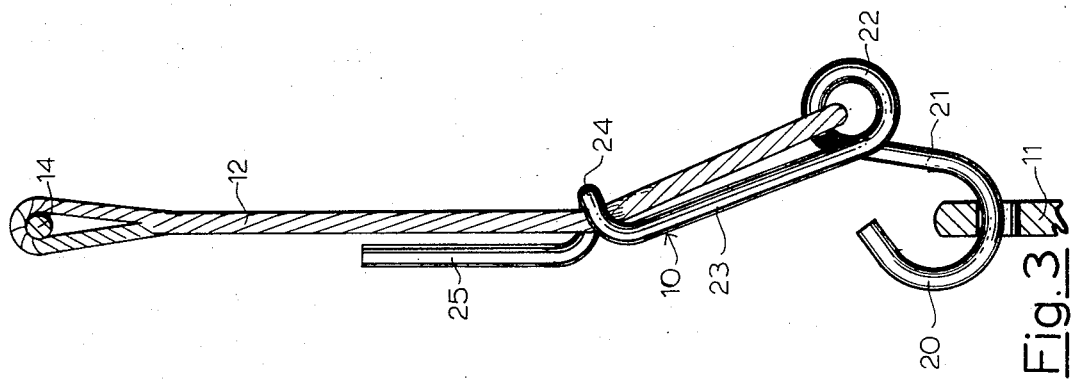
Fig. 3
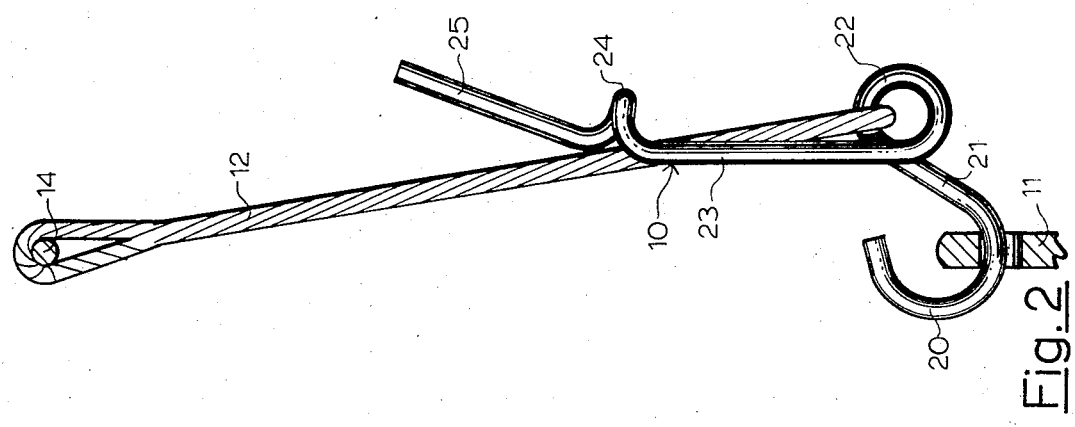
Fig. 2
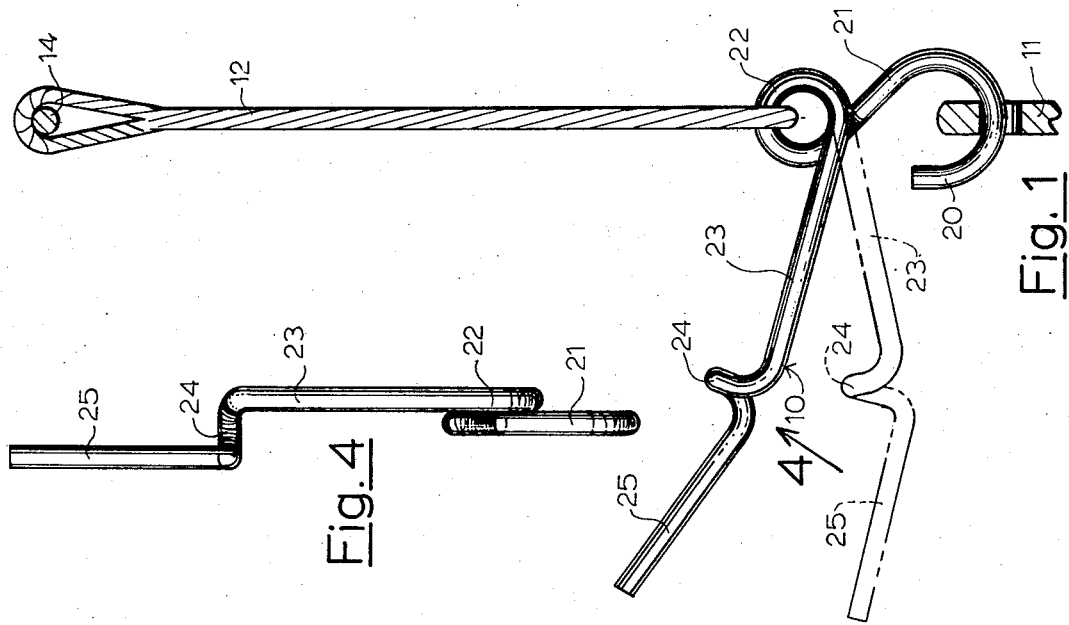
Fig. 4
Fig. 1

LINE TIGHTENING LEVER

This invention relates to line tightening devices and particularly pertains to a manually swingable device which is self securing in the tightened position.

The various devices of the prior art have not proven entirely satisfactory as they are complicated in design and construction, expensive to manufacture, difficult to integrate, clumsy and slow acting in use, and do not satisfactorily tighten a line and hold it in the tightened position.

With the foregoing in view, it is a primary object of the invention to provide a line tightening lever which is simple in design and construction, inexpensive to manufacture, easy to integrate with a line, facile and quick acting in use, and which satisfactorily tightens the line and holds it in the tightened position.

A further object of the invention is to provide a lever having a pivoted fulcrum end, such as a hook, for engaging either the anchor or the load.

A further object of the invention is to provide a weight point on the lever for attaching a line to the lever, such as an eye loop, spaced from and solidly connected to the hook fulcrum end of the lever.

A further object of the invention is to provide a first arm leading from the weight point of the lever at a large angle relative to an axis extending between the fulcrum hook end and weight point eye with the arm constituting a primary power bar for manually swinging the eye and hook off their axis to lengthen their extension relative to the line to tighten it.

A further object of the invention is to provide a transverse abutment on the lever, such as a U-shaped bend, at the outer end of the first arm for engaging the line upon manual release of the lever to maintain the line tightening position of the lever.

A further object of the invention is to effect a turn in the line at the U-shaped bend with the mechanical advantage of the first arm under the exerted force of the lever with the turn shortening the extension of the line and thereby tightening the line in addition to the off-axis tightening action.

A further object of the invention is to provide a second arm leading outwardly from said U-shaped bend constituting a secondary power bar extension handle to give the user additional mechanical advantage to swing the lever.

These and other objects of the invention will become apparent by reference to the following description of a preferred embodiment of the line tightening lever embodying the invention taken in connection with the accompanying drawing, in which:

FIG. 1 is a side elevational view of the preferred embodiment, shown in the first mounted untightened position, together with a line and showing the fulcrum end hook, weight point eye, and the attached line on an axis between the anchor and the load and with the power bar arm lying at an angle to the axis;

FIG. 2 is a view similar to FIG. 1 showing the device in the tightened second position with the power arm angularly swung to the other side of the stated axis, the hook pivoted, and the eye lengthening the attached line;

FIG. 3 is a view similar to FIGS. 1 and 2 showing the device in the tightened third position with the U-shaped bend engaging the attached line and holding the lever in the tightened position; and FIG. 4 is an edge elevational view of the lever taken in the direction of the arrow 4 of FIG. 1, showing the eye and the transverse U-shaped bend more clearly.

Referring now to the drawing wherein like numerals refer to like and corresponding parts throughout the several views, the novel line tightening device comprises a lever 10 connected to an anchor 11 and an attached line 12 with the line 12 connected to a load 14.

More particularly, the lever 10 includes a fulcrum end hook 20 which is adapted to pivot relative to the anchor 11 or load 14 depending on to which it is connected. In the preferred one-piece construction, a neck 21 leads from the hook 20. A weight point eye 22 leads from the neck 21 for attachment to the line 12. When first mounted as shown in FIG. 1, the hook 20, eye 22, and line 12 lie on the axis between the anchor 11 and the load 14. A primary power bar first arm 23 extends from the eye 22 at a large angle to the stated axis. A U-shaped transverse bend 24 leads from the first arm 23. A secondary power bar second arm extension handle 25 leads from the bend 24. The stated large angle of the arm 23 may be shown in solid lines or in broken lines as seen in FIG. 1 or at angles adjacent thereto, not shown, depending on the measure of line take-up desired.

In operation, the user interconnects the line 12 and lever 10 with one another and between the anchor 11 and the load 14. He then pre-tightens the line 12 as taut as possible by hand or with the aid of other means, if desired. He then grasps the handle 25 and swings the lever 10 from the position of FIG. 1 to the position of FIG. 2. He then aligns the U-shaped bend 24 with the line 12, engages the bend 24 with the line 12, and releases the handle 25. This tightens the line and holds it tightened as now set forth. When the user swings the lever 10, the hook 20 pivots on the anchor 11 (or the load 14) and the eye 22 swings sidewise off the stated axis and swings lengthwise away from the load 14 and line 12. Both the sidewise and endwise movements of the eye lengthen the distance of the eye 22 from the load 14 and tighten the line 12 thereby as seen in FIG. 2. Upon the engagement of the U-shaped bend 24 with the line 12 and release of the handle 25, the force of the engagement of the U-shaped bend 24 puts an angular turn in the line 12 at the U-shaped bend thereby shortening the extension of the line 12, as seen in FIG. 3, relative to the straight line extension of the line 12 as seen in FIG. 2. This places additional tightening action on the line. The force of the primary power bar arm 23 is applied to the turn in the line 12 with the mechanical advantage of the short extension of the arm 23 to turn the line at an angle and to overcome the line's resistance thereto in its tightened condition. The drawing in FIG. 2 shows an overtravel of the lever 10 relative to the line. While this overtravel may occur, it does not usually happen in actual use and is so shown only for purposes of explanation. In actual use, the lever 10 usually is swung to the line 12 and the line 12 slipped inside the U-shaped bend 24 which obviates the overtravel and any excess reverse angular movement of the lever 10.

In the preferred embodiment, the lever 10 is made of one piece of steel rod or coil and formed to shape as shown. However, it may be made in a plurality of pieces and secured together, if desired, by any suitable process.

It has been found that in loads such as boats, snowmobiles, small vehicles, etc., that a lever 10 made of ⅜ diameter steel is suitable together with suitable line such as ¼ and ½ polyethylene, natural fiber, or nylon line either hollow, braided, or roped. The line thus may be rope, chain, cable, etc. Also the use may vary as the device is applicable for any line tightening job such as in car top, truck, trailer, airplane, and railway loads or in stationary loads such as tents, awnings, covers, tarpaulins, etc. The second arm 25 preferably lies at a small angle to the first arm 23 so that when the lever 10 is in the second position, FIG. 3, the second arm 25 lies parallel to the line 12 above the turn at the U-shaped bend 24 while the first arm 23 lies parallel to the line below the turn in the line. Thus the second arm 25 avoids projecting and the tendency to catch or be caught on things.

The scope of the invention is defined in the appended claims in view of the disclosure in the drawing and the description in the specification.

I claim:

1. A lever for increasing the tension in a line between an anchor and a load for securing the load with increased holding force, comprising,
   - a hook connecting end for attachment to one said anchor and load with pivotally movable engagement; said hook connecting end constituting the fulcrum point of said lever;
   - a neck leading from said hook connecting end;
   - a loop on said neck for attachment of a line thereto with said line leading to the other said load and anchor; said loop constituting the weight point of said lever;
   - said hook connecting end, said loop, and an attached line initially lying on an axis between said anchor and said load when first mounted;
   - a first arm leading from said loop and extending sidewardly therefrom at a large angle to said axis;
   - said first arm constituting said lever primary power bar;
   - a second arm extending endwise from said first arm constituting an extension handle to provide the user with added mechanical advantage to swing the lever, and
   - a transverse U-shaped bend at one said arm constituting line engaging means to hold said lever in the swung position;
   - said lever being actuated by manually forceably swinging said arm from its sidewardly extending position on one side of the axis toward and past said axis to an angular position on the other side of said axis whereby said hook connecting end pivots and said loop swings off said anchor-load axis and takes a position sidewise of said hook connecting end and endwise axially toward said hook connecting end whereby the line is extended under the leverage exerted;
   - said lever being held in the leverage exerting line extending position by manually placing said U-shaped bend over the line and releasing said arm with the force exerted by said first arm urging said U-shaped bend into forced engagement with the line to turn the line at said U-shaped bend at an angle leading from said loop thereby shortening the axial extension of the line to increase the tension and holding force of the line.

2. In a device as set forth in claim 1,
   - said second arm lying at a small angle relative to said first arm so as to lie substantially parallel to the line beyond said U-shaped bend.

* * * * *